United States Patent Office 3,281,468
Patented Oct. 25, 1966

3,281,468
β-PHENYL-β-HYDROXYETHYLAMINES
Jack Mills, Indianapolis, Ind., assignor to Eli Lilly and Company, Indianapolis, Ind., a corporation of Indiana
No Drawing. Filed May 2, 1962, Ser. No. 191,733
4 Claims. (Cl. 260—570.6)

This invention relates to a group of novel β-phenyl-β-hydroxyethylamines and to their acid addition salts. More specifically, this invention relates to novel highly active epinephrine antagonists and to novel processes employing these antagonists.

Epinephrine and its congeners inhibit or initiate actions both in a mammalian hosts and in excised mammalian tissue which have been characterized as involving either α-receptors or β-receptors. In general, the epinephrine antagonists of the past have chiefly blocked only those actions of epinephrine which have been characterized as involving the α-receptors. For example, one group of epinephrine antagonists are known as epinephrine reversal agents because they block the pressor effects of epinephrine but do not block the depressor effects. This class of compounds has yielded several useful hypotensive agents. Other groups of compounds inhibit other physiologic actions of epinephrine while simultaneously leaving unaffected a majority of the physiological effects of this substance. To date, very few compounds have been known that principally antagonize the β-receptor actions of epinephrine. These compounds block the action of epinephrine on the β-receptor sites by a competitive mechanism, i.e., they compete directly with epinephrine for the various β-receptors sites within the mammalian tissue. The first of these competitive inhibitors of epinephrine for β-receptor action sites was N-[β-(3,4-dichlorophenyl)-β-hydroxyethyl] isopropylamine or DCI as it is commonly known. DCI is extremely useful in studying the effects of epinephrine itself on a mammalian host since it has a relatively low intrinsic activity associated with an active affinity for epinephrine β-receptor sites. It is, however, not as active a blocking agent as is needed to study the more subtle effects of epinephrine in animals.

It is an object of this invention to provide a group of epinephrine blocking agents which have a high affinity for epinephrine β-receptor sites coupled with only a moderate, to substantially absent, degree of intrinsic activity when compared with the compounds of the prior art. Other objects of this invention will become apparent from the description as follows.

This invention provides a group of novel epinephrine antagonists comprising N-(β-substituted-phenyl-β-hydroethyl)-alkylamines, said alkylamines being members of the group consisting of isopropylamine, and t-butylamine. The said amines can be represented by the following formula:

R—CHOH—CH$_2$—NH—R$^1$ wherein R is a member of the group consisting of 2-fluoro-5-chlorophenyl, 2-fluoro-4-chlorophenyl, 2,4-dibromophenyl, 2-bromo-4-chlorophenyl, 3-iodophenyl, 4-diodophenyl, 3,4-dibromophenyl, 4-bromophenyl, 3-bromophenyl, β-naphthyl, 3-trifluoromethylphenyl, 2,3-dimethoxyphenyl, 2,4-dimethylphenyl, and 2,4-dichlorophenyl; and R$^1$ is a member of the group consisting of isopropyl, and t-butyl.

The acid addition salts of amines represented by the above formula are also included within the scope of this invention. These acid addition salts include salts derived from inorganic acids such as: hydrochloric acid, nitric acid, phosphoric acid, sulfuric acid, hydrobromic acid, hydriodic acid, nitrous acid, pyrosulfuric acid, hypophosphorous acid and the like, as well as salts of organic acids including: acetic acid, maleic acid, malic acid, tartaric acid, citric acid, benzoic acid, 2,4-dinitrobenzoic acid, p-chlorobenzoic acid, naphthoic acid, p-toluenesulfonic acid, phenylarsonic acid and the like.

The acid addition salts provided by this invention are high-melting crystalline solids whereas the amine bases are viscous oils or low-melting solids having a characteristic fishy odor. The amine bases are readily prepared by the following procedure, using the synthesis of N-[β-(β-naphthyl)-β-hydroxyethyl] isopropylamine for illustrative purposes only.

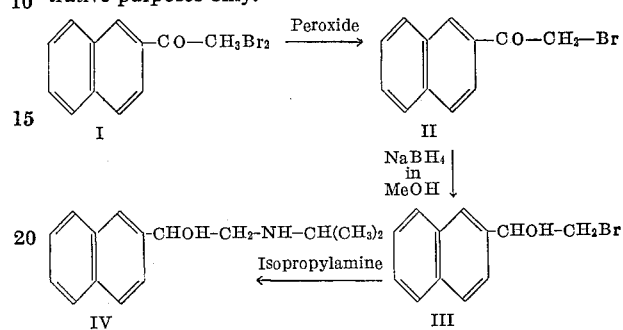

According to the above procedure, β-acetylnaphthalene (I) is brominated on the methyl group of the acetyl side chain to yield ω-bromo-β-acetylnaphthalene (II). This bromination takes place via a free radical mechanism and therefore is catalyzed by agents such as benzoyl peroxide, ultraviolet light, etc. Reduction of the ω-bromo-β-acetylnaphthalene with a metal hydride such as sodium borohydride in methanol solution yields the corresponding bromohydrin (III). Reaction of the bromohydrin with isopropylamine, usually in an inert solvent, produces the desired final product (IV), which is recovered as the free base and is ordinarily purified by distillation. Alternatively, the amine base can be converted to the corresponding hydrochloride salt, which is then purified by recrystallization or chromatography. Other compounds of this invention can be prepared according to the above procedure by employing a suitably substituted acetophenone in place of β-acetylnaphthalene or by employing t-butylamine or cyclopropylamine in place of isopropylamine in the above equation.

An alternative procedure exists for the preparation of compounds represented by the above formula wherein R$^1$ is an isopropyl group. According to this procedure, a suitably substituted benzaldehyde is condensed with nitroethane to yield a β-substituted-β-hydroxynitroethane derivative. Reduction of the nitro group of this compound with a metal hydride such as lithium aluminum hydride yields the corresponding β-substituted-phenyl-β-hydroxyethylamine. Reductive alkylation of the primary amine with acetone then readily produces the corresponding isopropylamine derivative.

The acid addition salts of this invention are useful in isolating and purifying the free bases represented by the above formula. They are most conveniently prepared by adding an equivalent of the desired acid to a solution of an amine base represented by the above formula. If the acid addition salt is insoluble in the reaction medium, as for example when ether is used as a solvent, the acid addition salt can be isolated by filtration. Alternatively, if a reaction medium is employed in which the acid salt is soluble, as for example ethanol, the acid addition salt is isolated by evaporation of the solvent. When a volatile acid such as hydrogen chloride is used to prepare the acid addition salt, an excess of the acid can be used since this excess can be readily removed by evaporation in vacuo.

The starting materials of the preferred process outlined above are either acetophenones or acetylnaphthylenes. These compounds are prepared by a Friedel-Crafts reaction involving the acetylation of a substituted benzene nucleus with acetyl chloride or acetic anhydride. Where the Friedel-Crafts reaction is carried out on an unsymmetrically substituted benzene, as for example metafluorochlorobenzene, the acetyl reactant can theoretically enter the molecule ortho to the fluorine, ortho to the chlorine or between the two substituents. Similarly, in p-fluorochlorobenzene there are two possible sites of entry for the acetyl group and in o-fluorochlorobenzene, there are four. In the examples which follow, the most probable structure has been assigned to the unsymmetrically substituted acetophenone based, upon the most reliable physical criteria available. However, it should be understood that I intend to claim the compound made by the particular process as given.

The following specific examples illustrate the preparation of the compounds of this invention:

EXAMPLE 1

*Preparation of N-[β-(2-fluoro-5-chlorophenyl)-β-hydroxyethyl] isopropylamine*

254 grams of acetyl chloride were added slowly with stirring to 585 grams of aluminum chloride. 291 grams of p-fluorochlorobenzene were added dropwise with stirring to the acetyl chloride-aluminum chloride mixture. After the addition had been completed, the reaction mixture was stirred at ambient room temperature for about an hour and was then warmed up to about 135° C. for about 10 minutes. Heating was discontinued and the mixture was stirred for an additional hour. The reaction mixture was then poured over a mixture of ice and 12 N hydrochloric acid. Ether was added and the organic phase was separated. The organic phase was washed once with an equal volume of water and was dried. The dried organic layer was distilled at a pressure of about 8 mm. of mercury, and 2-fluoro-5-chloracetophenone, formed in the above reaction, distilled in the range 100–105° C. at that pressure; $n_D^{25}=1.523$.

20 grams of 2-fluoro-5-chloracetophenone and 100 mg. of benzoyl peroxide were dissolved in 200 ml. of anhydrous ether. 24 grams of bromine were added dropwise at a rate such that the solution had substantially lost its bromine color between drops. After the addition of bromine had been completed, the reaction mixture was stirred for an additional hour at ambient room temperature and was then poured over ice. The ether layer was separated, was washed with an equal volume of water, and was dried. The ether was removed by evaporation in vacuo, leaving as a residue ω-bromo-2-fluoro-5-chloracetophenone, formed in the above reaction.

The ω-bromo-2-fluoro-5-chloracetophenone was dissolved in 300 ml. of methanol previously cooled to about 0° C. About 7.5 grams of sodium borohydride were added with stirring while the temperature of the reaction mixture was maintained in the range 0–10° C. After 2 hours, the reaction mixture was poured into an excess of 10 percent hydrochloric acid, which had been previously chilled to about 0° C. Ether was added and the organic phase was separated. The organic phase was washed successively with 10 percent hydrochloric acid and with water. The organic phase was dried and the solvents were removed therefrom by evaporation in vacuo, leaving as a residue β-(2-fluoro-5-chlorophenyl)-β-hydroxyethyl bromide formed in the above reaction.

16.5 grams of β-(2-fluoro-5-chlorophenyl)-β-hydroxyethyl bromide were refluxed gently with about 50 ml. of isopropylamine for about 12 hours. The excess amine was removed by evaporation in vacuo and the residue, comprising N-[β-(2-fluoro-5-chlorophenyl) - β - hydroxyethyl] isopropylamine hydrobromide and isopropylamine hydrobromide formed in the above reaction, was dissolved in 15 ml. of chloroform. The chloroform solution was contacted with 50 ml. of 20 percent aqueous sodium hydroxide, thus forming N-[β-(2-fluoro-5-chlorophenyl)-β-hydroxyethyl] isopropylamine free base, which separated and was taken up in ether. The ether extract was washed with water and was dried. The ether and any residual isopropylamine were removed by evaporation in vacuo, leaving as a residue N-[β-(2-fluoro-5-chlorophenyl)-β-hydroxyethyl] isopropylamine.

The free base was converted to the corresponding hydrochloride salt by dissolving the free base in anhydrous ether and saturating the ethereal solution with gaseous hydrogen chloride. The N-[β-(2-fluoro-5-chlorophenyl)-β-hydroxyethyl] isopropylamine hydrochloride thus produced was insoluble in ether. The crystalline insoluble salt was collected by filtration. Recrystallization from acetone yielded N-[β-(2-fluoro-5-chlorophenyl) - β - hydroxyethyl] isopropylamine hydrochloride melting at about 103–105° C.

In the above description, it has been assumed that acetyl chloride reacted with p-fluorochlorobenzene to yield 2-fluoro-5-chloracetophenone. While this assumption is in accordance with prevalent theories of substitution in the benzene ring, it is possible that the acetyl group entered the benzene ring ortho to the chlorine. The acetophenone produced, therefore, could have been the isomeric 2-chloro-5-fluoroacetophenone, and the final product could have been N-[β-(2-chloro-5-fluorophenyl)-β-hydroxyethyl] isopropylamine.

EXAMPLE 2

*Preparation of N-[β-(2-fluoro-4-chlorophenyl)-β-hydroxyethyl] t-butylamine*

The following reactions were carried out according to the process of Example 1. Acetyl chloride was reacted with m-fluorochlorobenzene in the presence of aluminum chloride to yield 2-fluoro-4-chloracetophenone boiling in the range 105–115° C. at a pressure of about 8 mm. of Hg; $n_D^{25}=1.523$. 2-fluoro-4-chloracetophenone was then brominated with bromine in the presence of benzoyl peroxide to yield ω-bromo-2-fluoro-2-chloracetophenone. The bromo ketone was reduced with sodium borohydride in ethanol to yield β-(2-fluoro-4-chlorophenyl)-β-hydroxyethyl bromide, and this compound was in turn reacted with t-butylamine to yield N-[β-(2-fluoro-4-chlorophenyl)-β-hydroxyethyl] t-butylamine, which was isolated as the free base.

The free base was converted to the hydrochloride salt by the process of Example 1, thus yielding N-β-(2-fluoro-4-chlorophenyl)-β-hydroxyethyl] t-butylamine hydro-chloride which melted at about 164–166° C. after recrystallization from a mixture of acetone and ether.

*Analysis.*—Calc.: C, 51.08; H, 6.43. Found: C, 50.78; H, 6.64.

In the above description, it has been assumed that acetyl chloride reacted with m-fluorochlorobenzene to yield 2-fluoro-4-chloracetophenone. While this assumption is in accordance with prevalent theories of substitution in the benzene ring, it is possible that the acetyl group entered the benzene ring ortho to the chlorine. The acetophenone produced, therefore, could have been the isomeric 2-chloro-4-fluorocetophenone, and the final product could have been N-[β-(2-chloro-4-fluorophenyl)-β-hydroxyethyl] isopropylamine.

EXAMPLE 3

*Preparation of N-[β(2,4-dibromophenyl)-β-hydroethyl] isopropylamine*

The following reactions were carried out according to the process of Example 1. m-Dibromobenzene was acetylated in the presence of aluminum chloride to yield 2,4-dibromoacetophenone boiling at about 100–107° C. at a pressure of 0.1 mm. of Hg; melting point about 60–62° C. 2,4-dibromoacetophenone was treated with bromine in the presence of benzoyl peroxide to yield ω-bromo-2,4-dibromoacetophenone. The bromo ketone was reduced with sodium borohydride in ethanol to yield β-2,4-dibromophenyl)-β-hydroxyethyl bromide. The latter was then reacted with isopropylamine to yield N-[β-(2,4-dibromophenyl)-β-hydroxyethyl] isopropylamine, which was isolated as the free base, melting at about 74–77° C.

The free base was converted to the hydrochloride salt by the method of Example 1. N-[β-(2,4-dibromophenyl)-β-hydroxyethyl] isopropylamine hydrochloride thus prepared melted at about 200–202° C.

EXAMPLE 4

*Preparation of N-[β-(2-bromo-4-chlorophenyl)-β-hydroxyethyl] isopropylamine*

The following reactions were carried out according to the process of Example 1. m-Bromochlorobenzene was acetylated with acetyl chloride in the presence of aluminum chloride as a catalyst to yield 2-bromo-4-chloracetophenone boiling at about 85–95° C. at a pressure of about 0.1 mm. of Hg; melting point, 44–45° C. This compound was brominated to yield ω-bromo-2-bromo-4-chloracetophenone. The bromo ketone was in turn reduced with sodium borohydride in ethanol to yield β-(2-bromo-4-chlorophenyl)-β-hydroxyethyl bromide. The latter was then reacted with isopropylamine to yield N-[β-(2-bromo-4-chlorophenyl)-β-hydroxyethyl] isopropylamine as the free base, which was purified by distillation. The distillate solidified upon standing; melting point, 82–86° C.

The free base was converted to the hydrochloride salt by the method of Example 1. N-[β-(2-bromo-4-chlorophenyl)-β-hydroxyethyl] isopropylamine hydrochloride thus prepared melted at about 191–193° C.

In the above description, it has been assumed that acetyl chloride reacted with m-bromochlorobenzene to yield 2-bromo-4-chloracetophenone. While this assumption is in accordance with prevalent theories of substitution in the benzene ring, it is possible that the acetyl group entered the benzene ring ortho to the chlorine. The acetophenone produced, therefore, could have been the isomeric 2-chloro-4-bromacetophenone, and the final product could have been N-[β-(2-chloro-4-bromophenyl)-β-hydroxyethyl] isopropylamine.

EXAMPLE 5

*Preparation of N-[β-(3-iodophenyl)-β-hydroxyethyl] isopropylamine* m-Iodoacetophenone was prepared according to the following procedure: 12 ml. of anhydrous ethanol and 1.2 ml. of carbon tetrachloride were added to 10 grams of magnesium, thus forming magnesium ethylate. 58 ml. of ether were added to the magnesium ethylate mixture. A second mixture containing 82.4 grams of malonic ester, 45 ml. of anhydrous ethanol, and 58 ml. of ether were added dropwise to the first solution, thus forming the magnesium salt of malonic ester. This reaction mixture was heated at refluxing temperature for about one hour in order to insure complete reaction of magnesium ethylate with malonic ester. m-Iodobenzoic acid was refluxed with an excess of thionyl chloride for about three hours. The volatile constituents were removed by evaporation in vacuo, leaving m-iodobenzoyl chloride as a residue. 53 grams of m-iodobenzoyl chloride thus prepared were diluted with 200 ml. of anhydrous benzene and the mixture was added dropwise with stirring to the magnesium malonate reaction mixture. After the addition had been completed, the combined reaction mixtures were heated to refluxing temperature for an additional 2 hours and were then poured onto a mixture of ice and 12 N hydrochloric acid. The organic phase containing diethyl m-iodobenzoylmalonate formed in the above reaction was diluted with 500 ml. of ether. The ether layer was washed with water and was dried. The ether was removed by evaporation in vauco.

Diethyl m-iodobenzoylmalonate was hydrolyzed by adding it to a mixture containing 94 ml. of water, 148 ml. of acetic acid, and 16 ml. of 18M sulfuric acid, and then refluxing the mixture for about 6 hours. The hydrolysis mixture was poured onto ice and the organic phase taken up in 500 ml. of ether. The ether layer was separated, and was washed successively with water, twice with 10 percent aqueous sodium hydroxide, and again with water. The ether layer was separated and dried. The ether was removed by evaporation in vacuo and the residue was distilled, yielding m-iodoacetophenone, boiling in the range 85–90° C. at a pressure of about 0.1 mm. of Hg; $n_D^{25} = 1.610$.

According to the procedure of Example 1, m-iodoacetophenone was converted to N-[β-(3-iodophenyl)-β-hydroxyethyl] isopropylamine by the following series of reactions: ω-Bromo-m-iodoacetophenone was prepared from m-iodoacetophenone by treatment with bromine in the presence of benzoyl peroxide as a catalyst. The ω-bromo-m-iodoacetophenone was reduced with sodium borohydride to yield β(m-iodophenyl)-β-hydroxyethyl bromide, and this compound was reacted with isopropylamine to yield N-[β-(3-iodophenyl)-β-hydroxyethyl] isopropylamine, which was purified by distillation. The distillate solidified and melted at 115–117° C.

N-β-(3-iodophenyl)-β-hydroxyethyl] isopropylamine free base was converted to the corresponding hydrochloride salt by the method of Example 1. The hydrochloride melted at about 158–160° C.

*Analysis.*—Calc.: C, 38.67; H, 5.01. Found: C, 38.58; H, 4.91.

EXAMPLE 6

*Preparation of N-[β-(3,4-dibromophenyl)-β-hydroxyethyl] isopropylamine*

The following reactions were carried out according to the process of Example 1. Acetyl chloride was reacted with o-dibromobenzene in the presence of aluminum chloride as a catalyst to yield 3,4-dibromacetophenone boiling at about 85–95° C. at a pressure of about 0.05 mm. of Hg; $n_D^{25} = 1.604$. The acetophenone was then reacted with bromine in the presence of benzoyl peroxide to yield ω,3,4-tribromacetophenone. The bromo ketone was reduced with sodium borohydride in ethanol solution to yield β-(3,4-dibromophenyl)-β-hydroxyethyl bromide. The latter was in turn reacted with isopropylamine to yield N-[β-(3,4-dibromophenyl)-β-hydroxyethyl] isopropylamine, which was isolated as the free base. The free base was converted to the hydrochloride salt, N-[β-(3,4-dibromophenyl)-β-hydroxyethyl] isopropylamine hydrochloride, which melted at about 199–200° C.

*Analysis.*—Calc.: C, 35.36; H, 4.31. Found: C, 35.54; H, 5.07.

EXAMPLE 7

*Preparation of N-[β-(4-bromophenyl)-β-hydroxyethyl isopropylamine*

The following reactions were carried out according to the process of Example 1: 4-bromacetophenone was reacted with bromine in the presence of benzoyl peroxide as a catalyst to yield ω,4-dibromacetophenone, which was a solid melting at about 108–110° C. ω,4-dibromacetophenone was reduced with sodium borohydride in ethanolic solution to yield β-(4-dibromophenyl)-β-hydroxyethyl bromide. The latter was reacted with isopropylamine without further purification, thus forming N-[β-(4-bromophenyl)β-hydroxyethyl] isopropylamine, which was isolated as the free base. Following the procedure of Example 1, the free base was converted to the hydrochloride salt, N-[β-(4-bromophenyl)-β-hydroxyethyl] isopropylamine hydrochloride, which melted at about 156–158° C.

*Analysis.*—Calc.: C, 44.83; H, 5.81. Found: C, 45.04; H, 5.71.

EXAMPLE 8

*Preparation of N-[β-(4-iodophenyl)-β-hydroxyethyl] isopropylamine*

4-iodoacetophenone was prepared from p-iodobenzoic acid by the procedure of Example 5. The product distilled in the range 90–95° C. at a pressure of 0.05 mm. of Hg. The distillate solidified and the solid melted at about 71–73° C.

Following the procedure of Example 1, 4-iodoacetophenone was reacted with bromine in the presence of benzoyl peroxide to yield ω-bromo-4-iodoacetophenone and the latter was reduced with sodium borohydride in ethanol to yield β-(4-iodophenyl)-β-hydroxyethyl bromide. The latter was reacted with isopropylamine to yield N-[β-(4-iodophenyl) - β - hydroxyethyl] isopropylamine, which was isolated as the free base. The free base was converted by the method of Example 1 to the hydrochloride salt, N-[β-(4 - iodophenyl)-β-hydroxyethyl] isopropylamine hydrochloride which melted at about 162–164° C.

Analysis.—Calc.: C, 38.67; H, 5.01. Found: C, 38.50; H, 5.05.

EXAMPLE 9

*Preparation of N-[β-(2-naphthyl)-β-hydroxyethyl] isopropylamine*

Following the procedure of Example 1, β-acetylnaphthalene was reacted with bromine in the presence of benzoyl peroxide to yield ω-bromo-β-acetylnaphthalene, and the bromo compound was reduced with sodium borohydride in methanol to yield β-(2-naphthyl)-β-hydroxyethyl bromide. The latter was reacted with isopropylamine to form N-[β-(2-naphthyl)-β-hydroxyethyl] isopropylamine, which was isolated as the free base. Following the procedure of Example 1 the free base was converted to the hydrochloride salt, N-[β-(2-naphthyl)-β-hydroxyethyl] isopropylamine hydrochloride which melted at about 168–170° C.

Analysis.—Calc.: C, 67.78; H, 7.58. Found: C, 67.54; H, 7.41.

EXAMPLE 10

*Preparation of N-[β-(3-bromophenyl)-β-hydroxyethyl] isopropylamine*

9.5 grams of sodium were dissolved in 250 ml. of anhydrous ethanol kept at a temperature in the range 5–15° C., thus forming sodium ethylate. The sodium ethylate solution was added dropwise to a mixture of 50 grams of 3-bromobenzaldehyde and 27.5 grams of nitromethane in 500 ml. of anhydrous ethanol. After the addition of the sodium ethoxide had been completed, the reaction mixture was stirred for an additional hour and was then diluted with one liter of water. The water solution was made neutral to litmus by the addition of glacial acetic acid and the neutral aqueous solution was extracted with ether. β-(3-bromophenyl)-β-hydroxynitroethane formed in the above reaction dissolved in the ethereal layer. The ethereal layer was washed with saturated sodium bicarbonate solution until all of the acetic acid had been removed as the water-soluble sodium salt. The ethereal layer was then washed with saturated sodium chloride solution and was dried. The ether was removed by evaporation in vacuo, leaving as a residue β-(3-bromophenyl)-β-hydroxynitroethane.

92 grams of β-(3-bromophenyl)-β-hydroxynitroethane were added to a solution of 45.6 grams of lithium aluminum hydride in 2500 ml. of anhydrous ether. After the addition had been completed and the reaction mixture had been stirred at ambient room temperature for an hour, the reaction mixture was decomposed by the successive addition of 48 ml. of water, 30 ml. of 20 percent sodium hydroxide, and 117 ml. of water. The mixture was then diluted with ether. The ether layer was separated and was washed with an equal volume of 10 percent HCl, thus converting β-(3-bromophenyl)-β-hydroxyethylamine formed in the above reaction to its hydrochloride salt, which passed into the aqueous layer. The aqueous layer was made alkaline, thus forming β-(3-bromophenyl)-β-hydroxyethylamine free base, which was insoluble in the alkaline solution. The free base was extracted with ether. The ether layer was separated and the ether removed therefrom by evaporation in vacuo, leaving β-(3-bromophenyl) - β - hydroxyethylamine free base as a residue. The free base was dissolved in ether and the ethereal solution was saturated with anhydrous hydrogen chloride gas, thus forming insoluble β-(3-bromophenyl)-β-hydroxyethylamine hydrochloride, which was separated by filtration. The hydrochloride salt melted at about 245° C. with decomposition.

A mixture of 15.5 grams of β-(3-bromophenyl)-β-hydroxyethylamine and 12.5 grams of acetone was refluxed for about one hour. The reaction mixture was then placed in a low-pressure hydrogenation apparatus and was hydrogenated, using palladium-on-charcoal as a catalyst. After the theoretical quantity of hydrogen had been absorbed, the hydrogenation mixture was filtered to remove the catalyst and the filtrate was evaporated to dryness. The residue, comprising N-[β-(3-bromophenyl) - β - hydroxyethyl] isopropylamine formed in the above reaction, was dissolved in 10 percent aqueous hydrochloric acid. The acidic aqueous layer was washed with ether, the ether phase being discarded. The acidic aqueous layer was made basic with 40 percent sodium hydroxide, thus forming N-[β-(3-bromophenyl) - β - hydroxyethyl] isopropylamine free base, which was insoluble in the alkaline solution and was extracted into ether. The ether extract was washed with a saturated sodium chloride solution and was dried. The ether was removed therefrom by evaporation in vacuo, leaving N-[β-(bromophenyl)-β-hydroxyethyl] isopropylamine free base as a residue. The residue was dissolved in ether and the ethereal solution was saturated with anhydrous hydrogen chloride gas, thus forming insoluble N-[β-(3-bromophenyl) - β - hydroxyethyl] isopropylamine hydrochloride, which melted at about 150° C.

EXAMPLE 11

*Preparation of N-[β-(2,4-dichlorophenyl)-β-hydroxyethyl] t-butylamine*

2,4-dichlorobenzoic acid was reacted with thionyl chloride by the method of Example 5. 2,4-dichlorobenzoyl chloride thus formed boiled at about 75° C. at a pressure of about 0.1 mm. of Hg; $n_D^{25}=1.588$. Following the procedure of Example 5, 2,4-dichlorobenzoylchloride was reacted with the magnesium salt of ethyl malonate to yield diethyl 2,4-dichlorobenzoylmalonate. Hydrolysis and decarboxylation of this compound yielded 2,4-dichloracetophenone, boiling at about 115–120° C. at a pressure of about 15 mm. of mercury. 2,4-dichloracetophenone was reacted with bromine in the presence of benzoyl peroxide as a catalyst and using anhydrous ether as a solvent to yield ω-bromo-2,4-dichloracetophenone. Reduction of the bromo ketone by the method of Example 1 by means of sodium borohydride in methanol yielded β-(2,4-dichlorophenyl)-β-hydroxyethyl bromide. Following the procedure of Example 1, β-(2,4-dichlorophenyl)-β-hydroxyethyl bromide and t-butylamine were diluted with an equal volume of anhydrous ethanol and the solution was heated to refluxing temperature for about 14 hours. The solvent was removed by evaporation in vacuo, leaving as a residue N-[β-(2,4-dichlorophenyl)-β-hydroxyethyl] t - butylamine and t - butylamine hydrobromides formed in the above reaction. The residue was dissolved in water and the aqueous solution was made basic with 40 percent sodium hydroxide, thus forming N-[β-(2,4-dichlorophenyl)-β-hydroxyethyl] t-butylamine free base which, being insoluble in the alkaline solution, separated and was extracted into ether. The ether extract was separated and was dried. The ether was removed by evaporation in vacuo, leaving as a residue N-[β-(2,4-dichlorophenyl)-β-hydroxyethyl] t-butylamine.

Following the procedure of Example 1, N-[β-(2,4-dichlorophenyl)-β-hydroxyethyl] t-butylamine hydrochloride was prepared by dissolving the free base in ether and saturating the ether solution with gaseous HCl. The precipitate of N-[β-(2,4-dichlorophenyl)-β-hydroxyethyl] t-butylamine hydrochloride thus formed was separated by filtration. Recrystallization of the precipitate from ethanol yielded N-[β-(2,4-dichlorophenyl)-β-hydroxyethyl] t-butylamine hydrochloride melting at about 152–154° C.

*Analysis.*—Calc.: C, 48.26; H, 5.74. Found: C, 48.39; H, 6.05.

EXAMPLE 12

*Preparation of N-[β-(3-trifluoromethylphenyl)-β-hydroxyethyl] t-butylamine*

Following the procedure of Example 5, 3-trifluoromethylbenzoic acid was converted by the action of thionyl chloride to 3-trifluoromethylbenzoyl chloride, which boiled at about 67° C. at a pressure of about 10 mm. of Hg; $n_D^{25} = 1.475$. 3-trifluoromethylbenzoyl chloride was reacted by the procedure of the same example with the magnesium salt of malonic ester to yield diethyl 3-trifluoromethylbenzoylmalonate, which upon hydrolysis and decarboxylation, yielded 3-trifluoromethylacetophenone boiling at about 60–64° C.; $n_D^{25} = 1.459$.

Following the procedure of Example 1, 3-trifluoromethylacetophenone was brominated to yield ω-bromo-3-trifluoromethylacetophenone and the bromo ketone was reduced with sodium borohydride in methanol solution to yield β-(3-trifluoromethylphenyl) - β - hydroxyethyl bromide. The latter in turn was mixed with an excess of t-butylamine in an equal volume of ethanol and the resulting solution was heated at refluxing temperature for about 14 hours. N-[β-(3 - trifluoromethylphenyl)-β-hydroxyethyl] t-butylamine was isolated as the free base by the procedure of Example 1, and the free base was converted to the corresponding hydrochloride salt by the procedure of the same example. N-[β-(3-trifluoromethylphenyl)-β-hydroxyethyl] t-butylamine hydrochloride thus prepared melted at about 191–193° C. after recrystallization from an ethanol-ether solvent mixture.

β-(3 - trifluoromethylphenyl)-β-hydroxyethyl bromide was reacted with isopropylamine in ethanol by the above procedure to yield N-[β-(3-trifluoromethyl)-β-hydroxyethyl] isopropylamine, which was isolated as the free base, and the free base was converted to the hydrochloride salt by the method of Example 1. N-[β-(3-trifluoromethylphenyl)-β-hydroxyethyl] isopropylamine hydrochloride thus prepared melted at about 150–152° C. after recrystallization from an ethanol-ether solvent mixture.

*Analysis.*—Calc.: F, 20.09; C, 50.79; H, 6.04. Found: F, 20.23; C, 50.95; H, 6.26.

EXAMPLE 13

*Preparation of N-[β-(2,3-dimethoxyphenyl)-β-hydroxyethyl] isopropylamine*

Following the procedure of Example 5, 2,3-dimethoxybenzoic acid was reacted with thionyl chloride to yield 2,3-dimethoxybenzoyl chloride. The acid chloride was in turn reacted, according to the procedure of the same example, with the magnesium salt of malonic ester to yield diethyl 2,3-dimethoxybenzoylmalonate. This compound was hydrolyzed to the di-acid and the di-acid decarboxylated to yield 2,3-dimethoxyacetophenone. Bromination of the acetophenone derivative by the procedure of Example 1 yielded ω-bromo-2,3-dimethoxyacetophenone. Reduction of the ω-bromacetophenone with sodium borohydride in methanol solution yielded the bromohydrin, β-(2,3-dimethoxyphenyl)-β-hydroxyethyl bromide. Reduction of the bromohydrin with an excess of isopropylamine yielded N-[β-(2,3-dimethoxyphenyl)-β - hydroxyethyl isopropylamine, which was isolated as the free base by the procedure of Example 1. N-[β-(2,3-dimethoxyphenyl) - β - hydroxyethyl isopropylamine, which was isolated as the free base by the procedure of Example 1. N-[β-(2,3-dimethoxyphenyl)-β-hydroxyethyl] isopropylamine distilled at about 135° C. at a pressure of about 0.1 mm. of Hg.

N-[β-(2,3-dimethoxyphenyl)-β - hydroxyethyl] isopropylamine hydrochloride was prepared from the free base by the procedure of Example 1, and melted at about 106–108° C.

*Analysis.*—Calc.: C, 56.62; H, 8.04. Found: C, 56.61; H, 8.31.

EXAMPLE 14

*Preparation of N-[β-(2,4-dimethylphenyl)-β-hydroxyethyl] isopropylamine*

The following reaction sequence was carried out according to the procedure of Example 1. m-Xylene and acetyl chloride were reacted under Friedel-Crafts conditions to yield 2,4-dimethylacetophenone, which boiled in the range 95–98° C., $n_D^{25} = 1.531$. The acetophenone was brominated to yield ω-bromo-2,4-dimethylacetophenone, and the bromo ketone was reduced with sodium borohydride in methanol to yield β-(2,4-dimethylphenyl)-β-hydroxyethyl bromide. Reaction of this bromohydrin with an excess of isopropylene yielded N-[β-(2,4-dimethylphenyl)-β-hydroxyethyl] isopropylamine, which was isolated as the free base. The free base was converted to the corresponding hydrochloride salt by the method of Example 1. N-[β-(2,4-dimethylphenyl)-β-hydroxethyl] isopropylamine hydrochloride melted at about 164–166°C.

*Analysis.*—Calc.: C, 64.04; H, 9.09. Found: C, 64.48; H, 9.30.

In its process aspects, this invention provides a method of blocking the β-receptor actions of epinephrine with a compound selected from the group consisting of the amine bases represented by the following formula:

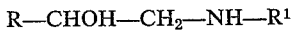

and the acid addition salts thereof, wherein R is a member of the group consisting of 2-fluoro-5-chlorophenyl, 2-fluoro-4-chlorophenyl, 2,4-dibromophenyl, 2-bromo-4-chlorophenyl, 3-iodophenyl, 4-iodophenyl, 3,4-dibromophenyl, 4-bromophenyl, 3-bromophenyl, β-naphthyl, 3-trifluoromethylphenyl, 2,3-dimethoxyphenyl, 2,4-dimethylphenyl, and 2,4-dichlorophenyl; and $R^1$ is a member of the group consisting of isopropyl, and t-butyl.

Also included in this process is the blocking of the β-receptor actions of substances related to epinephrine including both synthetic and naturally occurring compounds. This action of epinephrine can be both inhibitory and activating in nature and includes relaxation of smooth muscle of the uterus, trachea, bronchi, and blood vessels as well as positive inotropic and chronotropic effects on the heart. The increase in heart rate is an activating effect of epinephrine upon the β-receptors and the decrease in blood pressure is probably an inhibitory effect on other β-receptors in blood vessels. The compounds of this invention as used in my novel process block the increase in heart rate and decrease in blood pressure brought about by an injection into the host animal of epinephrine or epinephrine-like substances such as isoproterenol. In so doing, they block both activating and inhibitory actions of epinephrine on the β-receptors. The compounds block these actions of epinephrine by acting as competitive antagonists for epinephrine at its post synaptic sites of action, these sites being in general where epinephrine is bound to a cell or cellular enzyme system. In order to accomplish this epinephrine blocking action, the compounds of this invention are provided in the form of a solution of a nontoxic pharmaceutically acceptable acid addition salt which is injected into the animal under study and is carried by the blood stream to the adrenergic receptor site. The activation of the adrenergic receptor sites by epinephrine can be accomplished by injecting a solution of an epinephrine salt into the host animal or by stimulation of sympathetic nerves. However, epinephrine is a naturally occurring hormone, being one of the substances elaborated by the adrenals, and the mammalian host can be stimulated to generate its own epinephrine. The compounds of this invention will inhibit the action of epinephrine on β-receptor sites regardless of the origin of the epinephrine or other similar substance.

In the above remarks, the term "pharmaceutically acceptable acid addition salt" was used. By this term is meant salts of the amine bases of this invention which are substantially no more toxic than the amine base itself when injected or otherwise carried into the blood stream of a mammalian host, and includes such salts as the sulfate, phosphate, acetate, hydrochloride, benzoate, etc.

The following example illustrates the use of one of the compounds of this invention in antagonizing the effect of epinephrine in an intact animal.

EXAMPLE 15

*Antagonism of epinephrine by N-[β-(2,4-dichlorophenyl) β-hydroxyethyl] isopropylamine in a cat*

An adult cat was anesthetized with chloralose. The femoral artery was cannulated and the cannula was attached to a mercury manometer in order to record the mean femoral arterial pressure. The electrocardiogram was recorded from needle electrodes. The heart rate was computed from Lead II of the electrocardiogram. The response of the heart rate and blood pressure to intravenous injection of 2.5 to 5.0 mcg. per kg. of epinephrine was determined. After the blood pressure and heart rate of the cat had returned to normal, N-[β-(2,4-dichlorophenyl) - β - hydroxyethyl] isopropylamine hydrochloride was injected into the cat at a dose level of 1 mg. per kg. and the same two dose levels of epinephrine were again administered. The increase in heart rate was only a percent of that given by epinephrine alone.

The effects of epinephrine upon mammals can also be determined by studying its action upon isolated mammalian tissues. For example, epinephrine will relax guinea pig uterine strips put into spasm by the action of methacholine or pituitrin. The compounds of this invention block these in vitro actions of epinephrine on β-receptor sites by means of the novel processes of this invention. Another action of epinephrine which can be demonstrated in vitro is its ability to reinforce both the rate and force of a heart beat in an isolated guinea pig atrium. This action can also be blocked by the processes of this invention. The most satisfactory test, however, for the blocking of epinephrine β-receptor inhibitory action is another in vitro test and comprises the inhibition of the epinephrine-induced relaxation of guinea pig tracheae. In this test, guinea pig tracheal rings are prepared by dividing a trachea into about 15 rings. A chain of about 10 rings is prepared and the chain is put into spasm by the action of pilocarpine. Epinephrine will relax this pilocarpine-induced spasm. The epinephrine antagonists provided by this invention inhibit this relaxation of a pilocarpine-induced spasm of tracheal chain and in so doing are some 10 to 33 times more effective than the compounds of the prior art.

In all these epinephrine β-receptor blocking actions, the compounds of this invention are virtually devoid of any β-receptor activity of their own. For example, the compounds have no effect either in enhancing or inhibiting the pilocarpine-induced spasm of the guinea pig tracheal chain at concentration at which the compounds of the prior art have shown slight-to-moderate activity.

When a process involving the blocking of epinephrine action on the β-receptor action sites is carried out under in vitro conditions, the epinephrine blocking agent is provided as a solution of an acid addition salt. Customarily, this solution is added to a solution of dilute minerals such as Ringer's solution or Tyrode's solution in which the excised mammalian tissue is bathed.

The effect of epinephrine upon other isolated mammalian tissues can be determined in like fashion. For example, such tissues as isolated smooth muscle strips, uterus muscle, heart muscle, etc., can be placed in a constant temperature bath and treated with epinephrine. One of the compounds of this invention can then be added to the bath along with the epinephrine to see whether the effect of this latter substance is enhanced, inhibited or unaffected.

I claim:
1. A member of the group consisting of the amine bases represented by the following formula:

$$R-CHOH-CH_2-NH-R^1$$

and the acid addition salts thereof, wherein R is a member of the group consisting of 2,4-dibromophenyl, 3-iodophenyl, 4-iodophenyl, 3,4-dibromophenyl, 4-bromophenyl, 3-bromophenyl, 3 - trifluoromethylphenyl, 2,3-dimethoxyphenyl, 2,4-dimethylphenyl, and 2,4-dichlorophenyl; and $R^1$ is a member of the group consisting of isopropyl, and t-butyl.

2. N - [β-(3-trifluoromethylphenyl) - β - hydroxyethyl] t-butylamine

3. N - [β - (2,3-dimethoxyphenyl) - β - hydroxyethyl] isopropylamine

4. N - [β-(2,4 - dimethylphenyl) - β - hydroxyethyl] ispropylamine

References Cited by the Examiner

UNITED STATES PATENTS

| 2,816,059 | 12/1957 | Mills | 260—570.6 X |
|---|---|---|---|
| 2,938,921 | 5/1960 | Mills | 260—570.6 |
| 3,048,633 | 8/1962 | Russell et al. | 260—570.6 X |
| 3,215,732 | 11/1965 | Stephenson | 260—570.6 X |

OTHER REFERENCES

Ariens et al.: "Arch. Intern. Pharmacodyn.," vol. 127 pp. 479–96 (1960).

Rajagopalan et al.: "Chemical Abstracts," vol. 39, p. 3594 (1945).

Spath et al.: "Chemical Abstracts," vol. 32, pp. 6821–22 (1948).

Asscher: "Chemical Abstracts," vol. 44, pp. 3939–40 (1950).

Tsatsas: "Chemical Abstracts," vol. 44, pp. 3997–8 (1950).

Tsatsas: "Chemical Abstracts," vol. 44, p. 4914 (1950).

Hartung et al.: "Chemical Abstracts," vol. 46, pp. 4501–2 (1952).

Lands: "Chemical Abstracts," vol. 47, p. 1839 (1953).

Corrigan et al.: "Chemical Abstracts," vol. 49, pp. 2353–4 (1955).

Radt: "Elsevier's Encyclopaedia of Organic Chemistry," vol. 12B, Series III, pp. 1119–21 (1950).

Manske et al.: "Jour. Amer. Chem. Soc.," vol. 51, pp. 1906–9 (1929).

Yale: "Journal of Med. Pharm. Chem.," vol. 1, No. 2, pp. 121–33 (1959).

Lands: "Journal Pharm. Exptl. Therap.," vol. 106, pp. 440–3.

Moran et al.: "Journal Pharm. Exptl. Therp.," vol. 124, pp. 223–37 (1958).

Levy et al.: "Journal Pharm. Exptl. Therap.," vol. 130, pp. 334–9 (1960).

Lucchesi et al.: "Journal Pharm. Exptl. Therap.," vol. 132, pp. 372–81 (1961).

Levy et al.: "Journal Pharm. Exptl. Therap.," vol. 133, pp. 202–10 (1961).

CHARLES B. PARKER, *Primary Examiner.*

JOSEPH P. BRUST, LEON ZITVER, *Examiners.*

R. V. HINES, *Assistant Examiner.*